(12) United States Patent
Santarsiero

(10) Patent No.: US 7,491,063 B1
(45) Date of Patent: Feb. 17, 2009

(54) HARMONY METER

(76) Inventor: Paul Santarsiero, 112 High Ridge Rd., Avon, CT (US) 06001

( * ) Notice: Subject to any disclaimer, the term of this patent is extended or adjusted under 35 U.S.C. 154(b) by 422 days.

(21) Appl. No.: 11/125,802

(22) Filed: May 10, 2005

Related U.S. Application Data

(60) Provisional application No. 60/571,402, filed on May 14, 2004.

(51) Int. Cl.
*G09B 19/00* (2006.01)

(52) U.S. Cl. .................................... 434/236

(58) Field of Classification Search ............... 434/128, 434/236, 238, 206; 116/284, 288, 298, 309
See application file for complete search history.

(56) References Cited

U.S. PATENT DOCUMENTS

| | | | | |
|---|---|---|---|---|
| 2,748,514 A | * | 6/1956 | Sulger | 40/495 |
| 2,883,765 A | * | 4/1959 | Blaine | 434/238 |
| 2,965,978 A | * | 12/1960 | Olson | 434/238 |
| 4,192,000 A | | 3/1980 | Lipsey | |
| 4,306,368 A | * | 12/1981 | Coghill et al. | 40/496 |
| 4,599,508 A | * | 7/1986 | Smetaniuk | 235/116 |
| 4,616,217 A | | 10/1986 | Nesbitt et al. | |
| 4,741,701 A | * | 5/1988 | Kossor | 434/238 |
| 5,092,778 A | * | 3/1992 | Shaver et al. | 434/236 |
| 5,297,016 A | | 3/1994 | Stephens et al. | |
| 5,338,276 A | | 8/1994 | Jull et al. | |
| 5,580,254 A | * | 12/1996 | Ramsey | 434/236 |
| 5,639,242 A | * | 6/1997 | Wilson | 434/238 |
| 5,640,774 A | * | 6/1997 | Goldman | 33/1 SD |
| 5,767,709 A | | 6/1998 | McClure | |
| 5,791,905 A | * | 8/1998 | Larson, Jr. | 434/247 |
| 5,833,466 A | * | 11/1998 | Borg | 434/236 |
| 5,939,914 A | | 8/1999 | McClure | |
| 5,954,512 A | * | 9/1999 | Fruge | 434/238 |
| 6,203,327 B1 | * | 3/2001 | Ottrando | 434/262 |
| 6,259,944 B1 | | 7/2001 | Margulis et al. | |
| 6,345,821 B1 | * | 2/2002 | Labrot | 273/236 |
| 6,572,380 B1 | * | 6/2003 | Buckley et al. | 434/238 |
| 6,722,886 B2 | * | 4/2004 | Blumberg | 434/236 |
| 6,876,103 B2 | | 4/2005 | Radusewicz et al. | |
| 6,906,533 B1 | | 6/2005 | Yoshida | |
| 2005/0008996 A1 | * | 1/2005 | Avivi-Meirson | 434/236 |

* cited by examiner

*Primary Examiner*—Kurt Fernstrom
(74) *Attorney, Agent, or Firm*—Ira S. Dorman

(57) ABSTRACT

A display for charting levels of selected human interests consisting of a base that has a plurality of radially arranged benchmarks of different levels of the selected interest. A pointer axially located on the display may be rotated from one bench mark to another. The plurality of factors having different values for the characteristics relate to the interests.

22 Claims, 5 Drawing Sheets

HARMONY METER

RELATED APPLICATIONS

This application claims priority under 35 U.S.C. § 119(e) to U.S. Provisional Application Ser. No. 60/571,402, entitled "Harmony Meter," filed on May 14, 2004, which is herein incorporated by reference in its entirety.

BACKGROUND OF INVENTION

1. Field of Invention

Human nature has generated wide interest in measuring and comparing levels of different types of human interests. These interests are widely diverse and include, for example, interests related to fitness, health, diet, children's behavior, athletics, employment, and others. In general, these interests are usually not systematically evaluated or presented in a fashion which permits day-to-day comparison of various levels of a particular interest. For the most part, these interests are written about in books, articles, and perhaps to some extent charts, which list various characteristics that affect a particular interest. Insofar as the Applicant is currently aware, there is no currently available system which permits measurements of changes day to day of different levels of a particular type of motivational interest.

SUMMARY OF INVENTION

The present invention provides a display for charting variable levels of selected types of human interests by calculating various values assigned to factors related to the interest. These types of interests that may be appropriately charted include, for example, diet, children's behavior, athletic and interpersonal relationships. A wide range of additional interests may also be charted and appropriately measured on a temporal basis.

In the present invention, the display provides a chart to measure levels of selected human interests comprising a base which, in a preferred embodiment, may consist of a clock-like member having a plurality of radially arranged benchmarks that are each intended to identify different measures of the selected interests. These benchmarks may comprise, for example, a series of cartoon faces, such as the well-known happy face, arrayed from a serious frown to a happy smile. The benchmarks may be further differentiated one from the other by numerical values. The benchmarks may be selectively identified by an axially located pointer having one end journalled for rotational movement from one benchmark to the other. In the preferred embodiment of the invention, the pointer, may incrementally snap from one position to another. In addition, factors which may characterize the human interests are also displayed on the base. Thus, for example, factors associated with dietary interests may consist of a sequential array of different foods, generally considered very healthful may be displayed along with a range of foods generally considered not healthful. At the healthful end, the factors may consist of a series of individual notations sequentially arranged, such as "low-salt pretzels," "multi-grain bagel," "glass of pure water," "veggies and low-fat dip," "no cheese pizza," "non-fat ice cream," "wheat germ," "PBJ on whole wheat," "8 ounces of orange juice," each numbered with a relevant numerical value. The factors of non-healthy foods may include "miscellaneous high-fat fast foods," "hydrogenated oil snacks," "cupcakes," "soda and sugary drinks," "high sugar cereals," "pizza and cheeses," "high-fat popcorn, potato chips, etc.," each also with a numerical value In the use of such a display, the user will, from time to time, add up a number of values conforming to factors representing food the user ate in a given time period and then move the pointer to the corresponding numbered benchmark. The foregoing display inherently induces the person using it to be more aware and mindful of the factors affecting this interest and thus, hopefully, will motivate the individual to select a better course of action.

It is therefore an object of the present invention to provide a display for charting levels of selected human interests, in which a base having a plurality of radially arranged benchmarks identifying different levels of the selected interest is provided. A pointer having one end journalled for rotation at the axial center of the benchmarks may be selectively rotated to a particular benchmark having a value corresponding to the total values of a group of relevant factors selected by the user.

It is also an object of the present invention to a display for charting comparative levels, in "yin-yang" style of different selected human interests.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
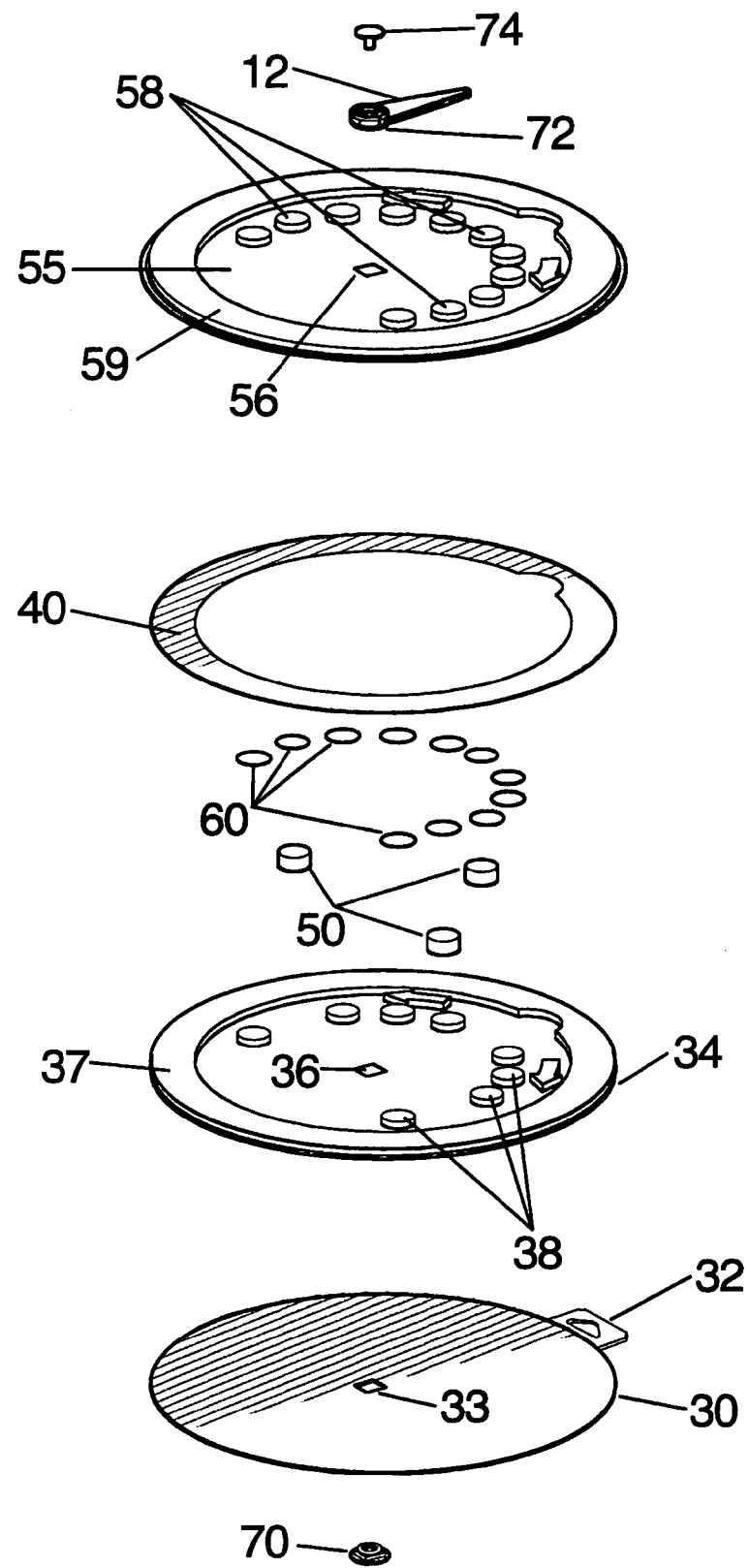
FIG. 1 is an exploded, perspective view of the components comprising a display embodying the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 4:
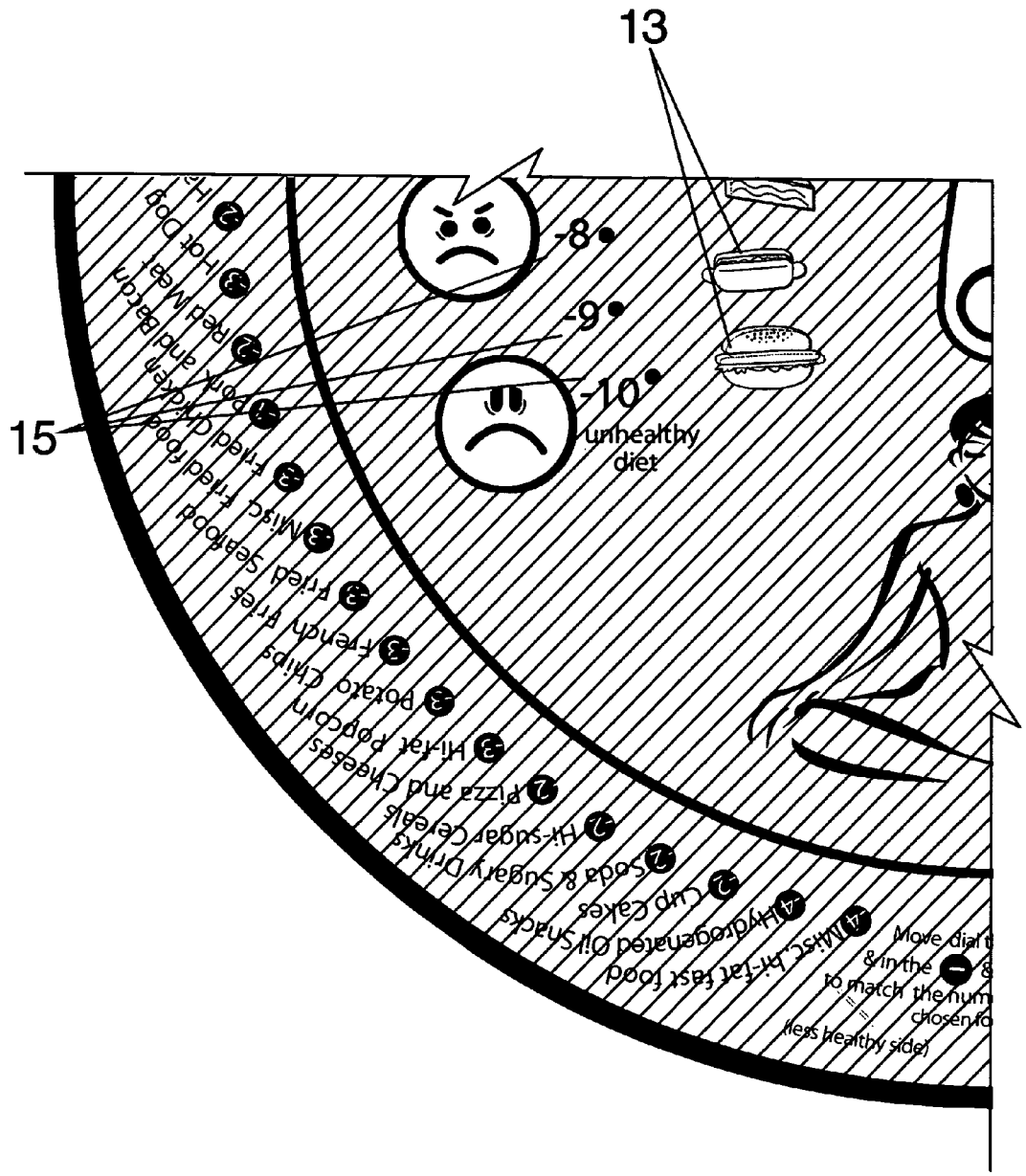
FIG. 4 is a representation of a quadrant of another display of human interest, namely, diets.

The present invention comprises a display for charting levels of selected human interests. The display in a preferred embodiment may comprise a clock-like display 10 (FIG. 2) having a centrally located rotational pointer 12 having one end 14 journalled for rotation on or near the axial center of the display 10. A series of benchmarks 18 are radially arranged about the one end 14 of the pointer 12. The pointer 12 may be rotated in stepped movements, as hereinafter described, from benchmark to benchmark, by simple finger force. Benchmarks 18 have indicia associated with each which identify different levels of the selected interest being measured. Thus, for example, a benchmark at one end of the array of benchmarks may have a happy face at 18a, while the benchmark at the other end, 18b, may have a sad face with the benchmarks in between scaled from one extreme of happiness to the other extreme of sadness. As illustrated in FIG. 4 relating to diet interests, the periphery of the display has various food factors that are printed around the periphery with each relevant food factor having an assigned value related to represent those foods with a negative diet impact having negative numbers and those with a positive impact having a positive number. In addition to the factors shown in the drawing, many others may be used including, for example, factors such as particular foods may be listed, with different values including non-fat yogurt +2, low-fat muffins +1, granola +3, skim milk and soy milk +2, while other foods having lower values may include hamburger −2, donuts −4, cookies −3, brownies −3. These and a myriad of other factor, each with values, are provided to allow the user to total the values for the particular foods eaten. In the example given, the numbers may range from +4 to −4. In the embodiment of the present invention, one particular benchmark 18c may be balanced at a numerical value of zero, with those benchmarks on the 18a side being plus numbers, up to a high number as for example 10; whereas the benchmarks from 18c to 18b would have negative numbers, also, for example, up to −10. The −10 benchmark would represent a very unhealthy diet, while the +10 benchmark would represent a healthy diet. Obviously the numbers in between −10 and +10 would be relatively healthy or unhealthy, depending upon the relative number involved.

Figure 3:
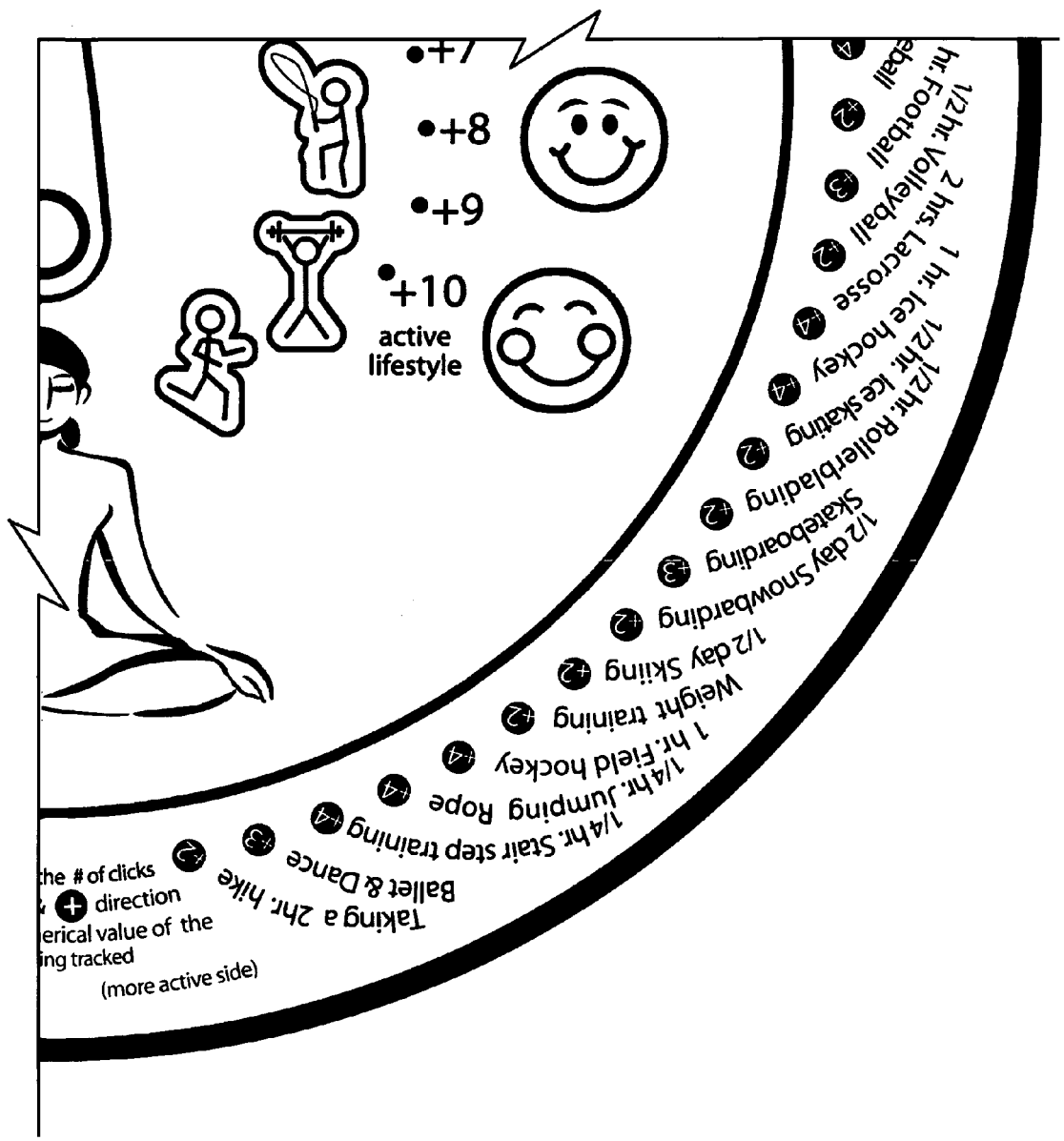
FIG. 3 is a representation of a quadrant of another display of human interests, in this case, athletic interests.

For interests relating to fitness (FIG. 3), for example, the individual factors may have such terms as physical chores (+1), one ½ hour walking (+2), one ½ hour jogging (+5), gardening (+1), one ½ hour swimming (+5), on the more helpful or active side of the array of factors, while on the negative side, such activities as sunbathing (−3), procrastinating (−4), watching sports (−2), napping or resting (−4), internet blogging (−3), and a wide range of other activities may also be provided.

Figure 2:
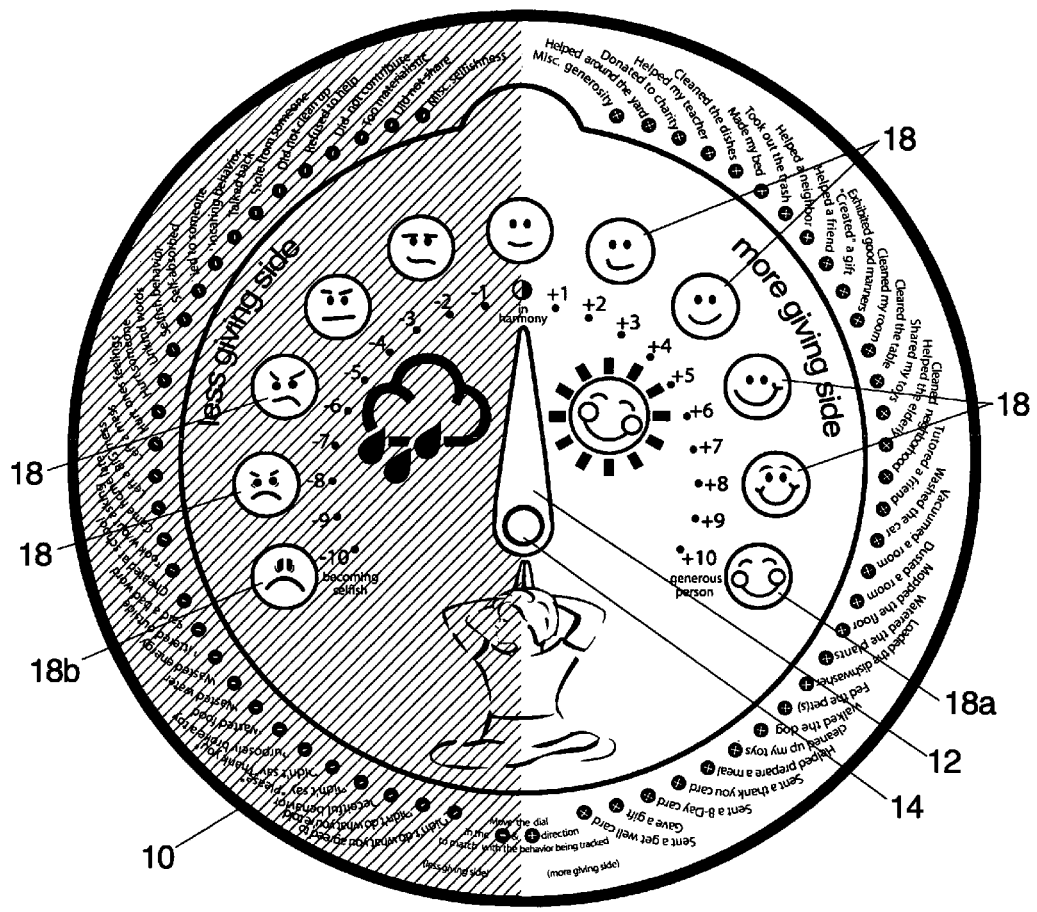
FIG. 2 is a plan view of an assembled display illustrating a particular interest, in this case "children's incentives," it being understood that the drawings are representative of a wide range of interests that might be displayed in a particular chart.

The display used in the present invention may have a number of forms, but in the preferred embodiment, the display is noted as a clock-like configuration, with the display formed of a base having a series of super imposed components, including, as illustrated in the drawing, a series of elements which may be die-cut or vacuum-formed. It is the base 10 that includes a bottom 30 which is die-cut of cardboard and which may be imprinted with appropriate indicia that is decorative in nature. The card may, for example, have an imprint of the particular type of interest being measured as, for example, diet (FIG. 4). Various illustrative decorations such as pictures of various foods 13 may be imprinted, together with a series of radially arranged numbers from +10 to zero to −10 15 representing a scale from a healthy diet (+10) to an unhealthy diet (−10). Also radially arranged are locations for the benchmarks that are to be positioned adjacent to the numbers. The bottom may also be provided with a hang tag 32 for hanging the display much the same as a clock. Vertically aligned above the die-cut bottom 30 is a clear vacuum form insert 34. The insert 34 is provided with a central, rectangular opening 36 aligned with a central rectangular opening 33 in the bottom 30. The insert 34 is formed with a series of vacuum-formed bosses 38. The bosses 38 are arranged radially and sized and shaped to accommodate a benchmark. Also provided in this embodiment is an annular, peripheral ridge 37 projecting upwardly from the center with its upper surface essentially level with the upper surfaces of the bosses 38. A series of die-cut buttons 60 or benchmarks are arrayed on the top of each of the bosses 38. These buttons or benchmarks 60 are imprinted, in this particular embodiment, with cartoon faces, with the faces sequentially arranged in incremental moods from a frown to a very happy face as illustrated in FIG. 2. Thus, for example, the face in FIG. 2 at 18a is a very happy face, while that at 18b is a very sad face. Arranged peripherally on the ridge 37 is a graphically imprinted disc 40 which may be die-cut from a cardboard and which is preferably imprinted with a series of facts relative to the interests being measured. These facts are selected depending upon the particular interests being measured. In the case of diet, the facts will preferably consist of a series of food products with each food product having a different value. Thus, for example, no-yolk eggs are +3, salad and low-fat dressing +2, 100% fruit drinks +1, miscellaneous vegetables +3, dried fruit +3, fruit rollups +3, miscellaneous fried foods −3, fried chicken −3, pork and bacon −1, red mean −2, hot dogs −3, etc. It is thus apparent that the facts identifying food has a plus or minus value depending upon how healthy the particular food identified might be. The arrangement of these foods are preferably such that the minus identified foods would be between the benchmark 18c and 18b, while the healthier foods would be between benchmark 18c and 18a, thus providing easy reference to an individual using the display.

Displays for other types of interests are also similarly arrayed, including, for example, a fitness display in which terms and values such as ½ hour volleyball +2, 1 hour ice hockey +4, skateboarding +3, avoiding activity −1, laying in bed too long −4, watching a movie −2, lounging around −3, sunbathing −3, may be used. For a child's incentive display, facts terms such as 'Helping a Friend' +1, 'Creating a Gift' +1, 'Share My Toys' +1, 'Big Mess' −1, 'Hurt One's Feelings' −1, 'Hurt Someone' −1, or other terms and values may also be used. The display may also be provided with three or more small, cylindrical magnets 50. These cylindrical magnets should be shaped and sized to fit underneath bosses 58 in spaced relation around the base with the magnets 50 secured in those positions when the unit it closed by insert 34 and the bottom 30. These magnets 50 will serve to allow the display to be mounted on a metal refrigerator wall as an alternative method of display to the hangar 32.

A clear vacuum-formed top 55 shaped and sized and sandwiched over the disc 40, insert 34, and bottom 30 is provided. The vacuum formed top 55 is formed with a rectangular opening 56 that is shaped and aligned with the openings 36 and 33. The upper surface of the top 55 is formed with bosses 58 similar in number, and shaped and sized, to nest with bosses 38 to secure the buttons or benchmarks 60 there between. The periphery of the top 55 is also provided with a raised annular rim 59 shaped and sized to nest with the ridge 37 to secure the disc 40 in place. The assembly is peripherally sealed after the pointer 12 is appropriately secured in the unit. The pointer 12 may be secured by a retainer 70 that projects upwardly through the openings 33, 36, and 56. The retainer 70 should have a shoulder securing it on the outer side of the bottom 30 and a rectangular shaped projection extending through the openings to prevent rotation of the retainer 70. The retainer is provided with an axial opening and a projecting annular shoulder, preferably with an outer splined surface having parallel channels that interengage inwardly projecting springs in the opening in the hub 72 of one end of the pointer 12. A rivet 74 extends downwardly through an axial opening in the hub 72 into the axial opening of the retainer 70 and is turned to engage and sandwich the end of the pointer for incremental snap rotation about the central axis.

Figure 5:
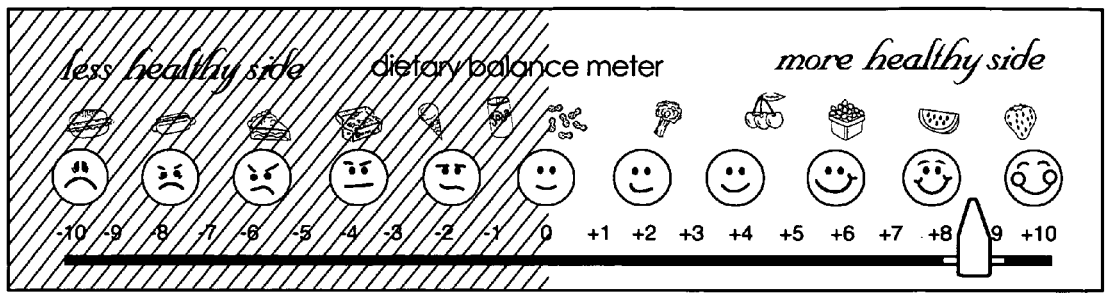
FIG. 5 is a representation of a linear embodiment of the present invention.
Figure 5:
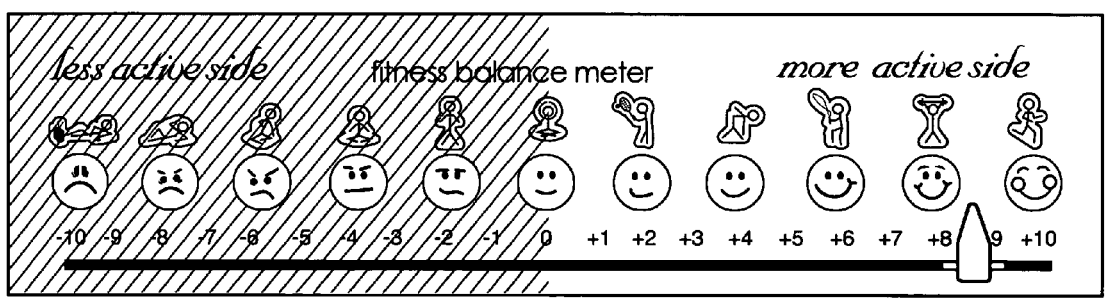
Figure 5:
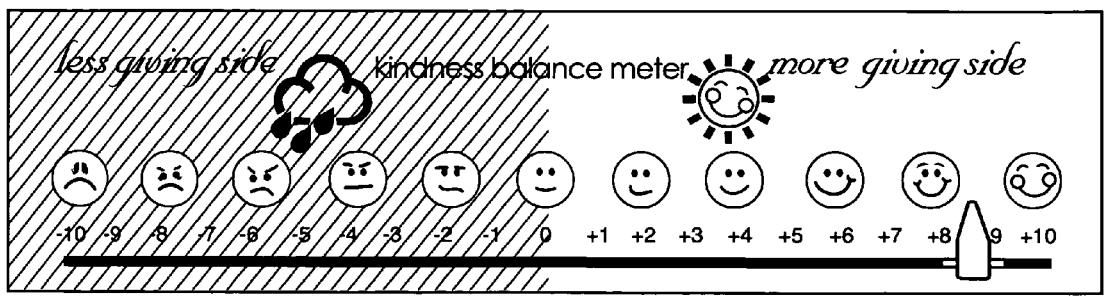

An alternate form of the present invention is illustrated in FIG. 5 which illustrates the different types of human interests with the benchmark illustrated in a linear array to be selectively identified by a pointer suitably secured for linear movement in an elongated slot extending the length of the array. The "yin-yang" aspect of the invention is characterized by the contrasting dark shading on the left side of each human interest scale and the light on the right side.

The invention may be adopted for computer or a PDA display in which tracking past performances would be enhanced and easily adapted.

Other arrangements that permit rotation of the pointer radially around the display while allowing it to remain in a selected position may also be provided.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A meter for charting levels of human activity and behavior, comprising:
    a base having a front face;
    a multiplicity of benchmarks having mood-indicating facial expression indicia thereon and arranged seriatim, as an array on said front face of said base, said facial-expression indicia incrementally indicting moods ranging from happy to sad, at least one of said benchmarks having a neutral mood-indicating facial-expression indicium thereon and being disposed at a central, neutral location of said base, a first plurality at least three of said benchmarks having positive mood-indicating facial-expression indicia thereon and extending in one direction from said neutral location of said base, and a second plurality of at least three of said benchmarks having negative mood-indicating facial-expression indicia thereon and extending from said neutral location in a direction opposite to said one direction, the mood-indicating expressions values of said indicia on said first plurality of benchmarks becoming progressively more happy as the distance of their positions from said neutral location increases, and the mood-indicating expressions of said indicia on said second plurality of benchmarks becoming progressively more sad as the distance of their positions from said neutral location increases, said indicia being designed to cumulatively and inherently induce improved behavior by a human subject; and
    an indicator mounted on said base for movement to selectively designate each of said benchmarks.

2. The meter of claim 1 wherein said array of benchmarks is generally circular, and wherein said indicator is rotatably mounted.

3. The meter of claim 1 wherein said first plurality and said second plurality of benchmarks consist of the same number of benchmarks, symmetrically arranged.

4. The meter of claim 3 wherein each of said first plurality and said second plurality of benchmarks comprises at least four benchmarks.

5. The meter of claim 2 wherein said front face of said base has a generally circular display thereon comprised of two semicircular portions of contrasting visual character and lying to opposite sides of an axis through said neutral location, said first plurality of benchmarks extending over one of said semicircular portions of said display and said second plurality of bench-marks extending over the other of said semicircular portions.

6. The meter of claim 1 wherein said array of benchmarks is generally rectilinear, and wherein said indicator is mounted for linear movement.

7. The meter of claim 6 wherein said front face of said base has a generally rectangular display thereon comprised of two generally rectangular portions of contrasting visual character and lying to opposite sides of an axis through said neutral location, said first plurality of benchmarks extending over one of said rectangular portions of said display and said second plurality of benchmarks extending over the other of said rectangular portions.

8. The meter of claim 1 additionally including means for supporting said base on a vertical surface.

9. The meter of claim 1 wherein said benchmarks comprise a multiplicity of projecting bosses.

10. The meter of claim 1 wherein each of said benchmarks comprises an icon constituting said mood-indicating facial-expression indicia.

11. The meter of claim 10 where said icons comprise cartoon faces, said faces being different from one another and expressing moods, ranging from sadness, at one end of said array, to a very happy face at an opposite end of said array.

12. The meter of claim 1 additionally including markings intermediate said benchmarks, representative of incremental values of activity or behavior.

13. The meter of claim 1 wherein said front face of said meter has a display thereon that includes information indicative of a human interest selected from the group consisting of interests of children, diet, fitness, personal conduct, athletics, and interrelational matters.

14. The meter of claim 1 wherein said base comprises an assembly of superimposed layers, including a bottom layer, an insert layer, a disc layer, and a clear top layer, secured together.

15. The meter of claim 14 wherein said benchmarks are applied on said disc layer and are visible through said top layer.

16. The meter of claim 14 wherein at least certain of said layers of said base are disengageably secured, to facilitate customization of said meter.

17. The meter of claim 1 additionally including quantifiable values associated with said benchmarks.

18. A method for monitoring levels of human activity and behavior of selected interest, comprising the steps:
    (a) providing a meter comprised of a base and an indictor, the base having a front face; a multiplicity of benchmarks having mood-indicating facial-expression indicia thereon and arranged seriatim, as an array on the front face of the base, said facial-expression indicia incrementally indicting moods ranging from happy to sad, at least one of the benchmarks having a neutral mood-indicating facial-expression indicium thereon and being disposed at a central, neutral location of the base, a first plurality at least three of the benchmarks having positive mood-indicating facial-expression indicia thereon and extending in one direction from the neutral location of the base, and a second plurality of at least three of the benchmarks having negative mood-indicating facial-expression indicia thereon and extending from the neutral location in the direction opposite to the one direction, the mood-indicating expressions of the indicia on the first plurality of benchmarks becoming progressively more happy as the distance of their positions from the neutral location increases, and the mood-indicating expressions of the indicia on the second plurality of benchmarks becoming progressively more sad as the distance of their positions from the neutral location increases, the indicia being designed to cumulatively and inherently induce improved behavior by a human subject; and the indicator being mounted on the base for movement to selectively designate each of the benchmarks;

(b) initially positioning the indicator so as to at least generally indicate a selected location of the base;

(c) noting an initial activity or behavior, of a selected interest that is to be monitored, by or of a human subject;

(d) moving the indicator from its initial position to a position for designating a selected benchmark of the first plurality or the second plurality, depending upon whether said noted activity or behavior by or of said human subject is positive or negative, respectively;

(e) noting a subsequent activity or behavior of said selected interest by or of said human subject;

(f) moving said indicator away from its then present position to a selected benchmark at a different position in the array, in either the one direction or the opposite direction, depending upon whether said subsequent activity or behavior is positive or negative, respectively; and (g) thereafter effecting multiple repetitions of said steps (e) and (f), in order and throughout any selected period of time so as to cause the meter to then indicate a cumulative level of activity or behavior by or of said human subject during said selected period of time.

19. The method of claim 18 performed to monitor a human interest selected from the group consisting of interests of children, diet, fitness, personal conduct, athletics, and interrelational matters.

20. A meter for charting levels of human activity and behavior, comprising:

a base having a front face;

a multiplicity of benchmarks having mood-indicating facial-expression indicia thereon and arranged seriatim, as an array on said front face of said base, said facial-expression indicia incrementally indicating moods ranging from happy to sad, one of said benchmarks having a neutral mood-indicating facial expression indicium thereon and being disposed at a central, neutral location of said base, a first plurality at least three of said benchmarks having positive mood-indicating facial-expression indicia thereon and extending in one direction from said a central, neutral location of said base, and a second plurality of at least three of said benchmarks having negative mood-indicating facial-expression indicia thereon and extending from said neutral location in a direction opposite to said one direction, the mood-indicating facial-expressions of said indicia on said first plurality of benchmarks becoming progressively more happy as the distance of their positions from said neutral location increases, and the mood-indicating facial expressions of said indicia on said second plurality of benchmarks becoming progressively more sad as the distance of their positions from said neutral location increases, said indicia being designed to cumulatively and inherently induce improved behavior by a human subject; said front face of said base having a display thereon comprised of two adjacent portions of contrasting visual character that intersect at and lie to opposite sides of an axis passing through said neutral location, at which said benchmark having said neutral mood-indicating indicia is disposed, said first plurality of benchmarks extending over one of said portions of said display and said second plurality of benchmarks extending over the other of said portions; and an indicator mounted on said base for movement to selectively designate each of said benchmarks.

21. A method for monitoring levels of human activity and behavior of selected interest, comprising the steps:

(a) providing a meter comprised of a base and an indictor, the base having a front face; a multiplicity of benchmarks having mood-indicating facial expression indicia thereon and arranged seriatim, as an array on the front face of the base, said facial-expression indicia incrementally indicating moods ranging from happy to sad, one of said benchmarks having a neutral mood-indicating facial expression indicium thereon and being disposed at a central, neutral location of said base, a first plurality at least three of the benchmarks having positive mood-indicating facial-expression indicia thereon and extending in one direction from the central, neutral location of the base, and a second plurality of at least three of the benchmarks having negative mood-indicating facial-expression indicia thereon and extending from the neutral location in the direction opposite to the one direction, the mood-indicating facial expressions of the indicia on the first plurality of benchmarks becoming progressively more happy as the distance of their positions from the neutral location increases, and the mood-indicating facial expressions of the indicia on the second plurality of benchmarks becoming progressively more sad as the distance of their positions from the neutral location increases, the indicia being designed to cumulatively and inherently induce improved behavior by a human subject, said front face of said base having a display thereon comprised of two adjacent portions of contrasting visual character that intersect at and lie to opposite sides of an axis passing through said neutral location, at which said benchmark having said neutral mood-indicating indicia is disposed, said first plurality of benchmarks extending over one of said portions of said display and said second plurality of benchmarks extending over the other of said portions; and the indicator being mounted on the base for movement to selectively designate each of the benchmarks;

(b) initially positioning the indicator at least generally so as to indicate a selected location of the base;

(c) noting an initial activity or behavior, of a selected interest that is to be monitored, by or of a human subject;

(d) moving the indicator from its initial position to a position for designating a selected benchmark of the first plurality or the second plurality, depending upon whether said noted activity or behavior by or of said human subject is positive or negative, respectively;

(e) noting a subsequent activity or behavior of said selected interest by or of said human subject;

(f) moving said indicator away from its then present position to a selected benchmark at a different position in the array, in either the one direction or the opposite direction, depending upon whether said subsequent activity or behavior is positive or negative, respectively; and (g) thereafter effecting multiple repetitions of said steps (e) and (f), in order and throughout any selected period of time so as to cause the meter to then indicate a cumulative level of activity or behavior by or of said human subject during said selected period of time.

22. The method of claim 21 performed to monitor a human interest selected from the group consisting of interests of children, diet, fitness, personal conduct, athletics, and interrelational matters.

* * * * *